R. L. Lewis,
Boot Tree
Nº 19,508. Patented Mar. 2, 1858.
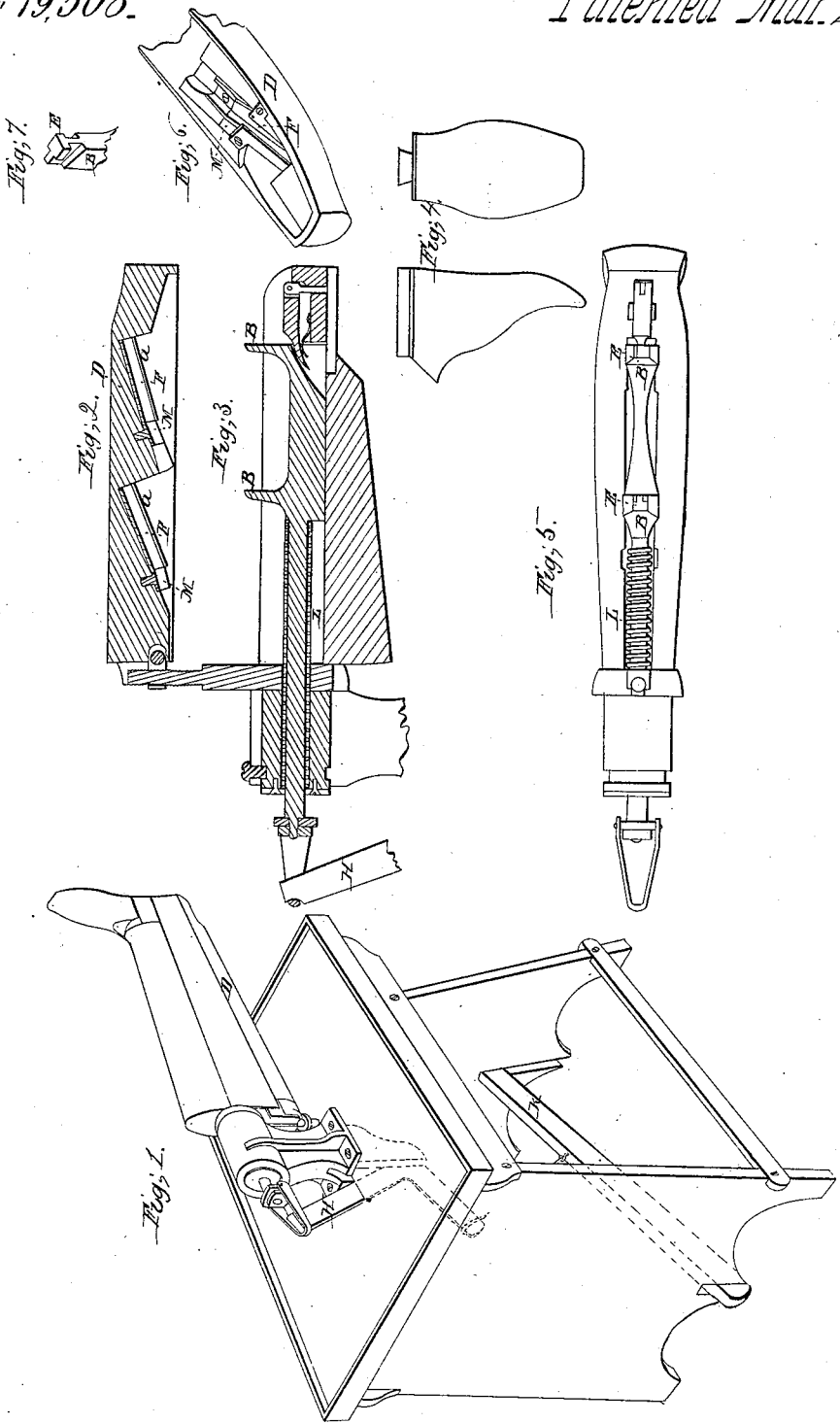

UNITED STATES PATENT OFFICE.

REUBEN L. LEWIS, OF MILFORD, MASSACHUSETTS.

BOOT-TREE.

Specification of Letters Patent No. 19,508, dated March 2, 1858.

*To all whom it may concern:*

Be it known that I, R. L. LEWIS, of Milford, in the county of Worcester and State of Massachusetts, have invented an Improvement in Boot-Trees, and that the following is a full, clear, and exact description of the principle or character which distinguishes it from all other things before known and of the usual manner of making, modifying, and using the same, reference being had to the annexed drawings.

Figure 1 is a perspective of the machine in working order. Fig. 2 a section through the back D referred to. Fig. 3 a section through the other part of the tree showing the manner of operating the back. Fig. 4 the foot pieces shown in two positions, removed from the tree. Fig. 5 exhibits an upper view, of the arrangement shown in Fig. 3 in section; Fig. 6 a perspective of part of the back; Fig. 7, a view of the T-shaped ends of projections B, B.

My invention consists in an improvement in revolving or swivel-boot trees whereby the backs of the same may be readily detached for the purpose of using different sizes of backs. To effect this object I combine the back D with the stretching rod as follows. B, B, are two projections from the axial stretching rod the ends E of which are T-formed making cross heads to run in the inclined ways or guides F, F. These guides are connected with the back as shown in Figs. 2 and 3 and are inclined sufficiently to furnish the necessary leverage in distending the boot tree by the action of the cross heads connected with the axial stretching rod. This rod has a longitudinal movement given to it in one direction by the bent lever H operated by the treadle K and is moved in the opposite direction by the helical spring L, and by its movements back and forth the tree is distended and contracted by the action of the cross heads upon the flanges $a$, $a$ of the inclined guides. The cross heads are entered within the inclined guides at the point M and it will follow that when the axial rod is moved to this point, the back at once becomes detached from the tree and another size may be substituted without loss of time. The shifting of backs with common boot trees is readily done but with the mounted swiveling boot trees it has not been hitherto done except by shifting the whole tree and as it is necessary to shift backs frequently in boot making the convenient shifting of the backs becomes a great saving of expense labor and time.

What I claim as my improvement in mounted swiveling boot trees is—

Combining the backs with the axial stretching rods by means of the inclined guides F and cross heads B, or other equivalent means, so that the backs can be readily changed in the manner and for the purposes herein set forth.

R. L. LEWIS.

Witnesses:
CHAS. G. PAGE,
R. L. CAMPBELL.